United States Patent
Petrich

(10) Patent No.: US 7,764,829 B2
(45) Date of Patent: *Jul. 27, 2010

(54) SYSTEM AND METHOD FOR DISCOVERING AND CATEGORIZING ATTRIBUTES OF A DIGITAL IMAGE

(76) Inventor: David B. Petrich, 7356 40th Ave. SW., Seattle, WA (US) 98136

( * ) Notice: Subject to any disclaimer, the term of this patent is extended or adjusted under 35 U.S.C. 154(b) by 33 days.

This patent is subject to a terminal disclaimer.

(21) Appl. No.: 11/506,640

(22) Filed: Aug. 18, 2006

(65) Prior Publication Data

US 2006/0280368 A1  Dec. 14, 2006

Related U.S. Application Data

(63) Continuation of application No. 10/188,660, filed on Jul. 2, 2002, now Pat. No. 7,113,633.

(60) Provisional application No. 60/302,919, filed on Jul. 2, 2001.

(51) Int. Cl.
*G06K 9/00* (2006.01)
*G03B 15/02* (2006.01)
*G09G 5/00* (2006.01)

(52) U.S. Cl. .................. 382/154; 362/16; 345/629

(58) Field of Classification Search ............... 382/154, 382/276, 284, 286, 291; 345/629, 633, 634; 362/3, 5, 16; 355/30; 235/456, 494; 273/378; 358/1.9, 2.1

See application file for complete search history.

(56) References Cited

U.S. PATENT DOCUMENTS

| | | | |
|---|---|---|---|
| 4,111,548 A | 9/1978 | Pechev et al. | |
| 4,202,008 A | 5/1980 | King | |
| 4,509,043 A | 4/1985 | Mossaides | |
| 4,589,013 A | 5/1986 | Vlahos et al. | |
| 4,694,398 A | 9/1987 | Croteau | |
| 5,241,166 A * | 8/1993 | Chandler | 235/494 |
| 5,432,683 A | 7/1995 | Brown | |
| 5,469,536 A | 11/1995 | Blank | |
| 5,481,439 A | 1/1996 | Goto | |
| 5,539,453 A | 7/1996 | David et al. | |
| 5,580,063 A * | 12/1996 | Edwards | 273/378 |
| 5,630,037 A | 5/1997 | Schindler | |
| 5,642,160 A | 6/1997 | Bennett | |
| 5,687,306 A | 11/1997 | Blank | |

(Continued)

FOREIGN PATENT DOCUMENTS

DE  195 02 459 A1  8/1996

(Continued)

OTHER PUBLICATIONS

Chandra, "Approaches to Digital Image Registration and Recognition", Dissertation for Auburn University, Dec. 1984.

(Continued)

*Primary Examiner*—Kanji Patel

(57) ABSTRACT

With respect to photography, the present invention includes a physical target device used in conjunction with computer software to ascertain and record such attributes as lighting conditions, perspective, and scale with regard to the assembly of two-dimensional photographic imagery, consisting of background and subject images, into realistic photo composites.

20 Claims, 17 Drawing Sheets

U.S. PATENT DOCUMENTS

| | | |
|---|---|---|
| 5,784,097 A | 7/1998 | Iinuma et al. |
| 5,799,082 A | 8/1998 | Murphy et al. |
| 5,886,818 A | 3/1999 | Summer et al. |
| 5,905,503 A | 5/1999 | Penna |
| 5,986,718 A | 11/1999 | Barwacz et al. |
| 6,005,987 A | 12/1999 | Nakamura et al. |
| 6,009,190 A | 12/1999 | Szeliski et al. |
| 6,034,739 A | 3/2000 | Rohlfing et al. |
| 6,034,740 A | 3/2000 | Mitsui et al. |
| 6,034,785 A | 3/2000 | Itoh |
| 6,075,883 A | 6/2000 | Stern et al. |
| 6,084,590 A | 7/2000 | Robotham et al. |
| 6,122,013 A | 9/2000 | Tamir et al. |
| 6,175,638 B1 | 1/2001 | Yanovsky |
| 6,195,513 B1 | 2/2001 | Nihei et al. |
| 6,270,228 B1 | 8/2001 | Axen et al. |
| 6,288,721 B1 | 9/2001 | Donoghue et al. |
| 6,304,298 B1 | 10/2001 | Steinberg et al. |
| 6,348,953 B1 | 2/2002 | Rybczynski |
| 6,356,339 B1 | 3/2002 | Enomoto |
| 6,556,722 B1 | 4/2003 | Russell et al. |
| 6,609,803 B2 | 8/2003 | Lichfield |
| 6,674,917 B1 | 1/2004 | Hisaki et al. |
| 7,079,157 B2 * | 7/2006 | Deering ...................... 345/613 |

FOREIGN PATENT DOCUMENTS

| | | |
|---|---|---|
| JP | 09-280826 | 10/1997 |
| WO | WO 97/31336 | 8/1997 |

OTHER PUBLICATIONS

Heckathorn et al., "Strategic Scene Generation Model," SSGM Papers Presented at the Meeting of the IRIS Speciality Group on Targets, Backgrounds and Discrimination, Jan. 1990.

Heckathorn et al., "Update on SDIO's Strategic Scene Generation Model", Photon Research Associates, Sep. 1990.

Wilcoxen et al., "Synthetic Scene Generation Model (SSGM R6.0)", SPIE, vol. 2469, pp. 300-316, Dec. 1991.

Divekar, "Guidelines to Animating CAD", DesignNet, pp. 57-59, 65, May 1992.

Linderholm, "Pretty as a Picture", WinMag.com, Dec. 2000.

International Search Report for PCT/US 02/21161, mailed Aug. 13, 2003.

* cited by examiner

SYSTEM AND METHOD FOR DISCOVERING AND CATEGORIZING ATTRIBUTES OF A DIGITAL IMAGE

CROSS-REFERENCE TO RELATED APPLICATIONS

This application is a continuation application of U.S. patent application Ser. No. 10/188,660, filed Jul. 2, 2002, now U.S. Pat. No. 7,113,633, the entire disclosure of which is incorporated herein by reference. U.S. Pat. No. 7,113,633 claims priority to U.S. Provisional Patent Application No. 60/302,919 filed Jul. 2, 2001.

FIELD OF THE INVENTION

The present invention relates to computer and photograph manipulation systems and machine vision technologies in general, and particularly to computer image processing software in the field of digital imaging and cinematography for creating virtual reality composite photographs and composite motion pictures.

BACKGROUND OF THE INVENTION

Photographs of people and products are traditionally captured by photographers who travel to distant locations for the purpose of producing imagery for merchandise catalogs, magazine advertisements, sales collateral and the like. The photographer is tasked with capturing the subject and a desirable background in camera, as one single photograph. This is common practice in photographing clothing, cars, furniture, house goods, etc. Computer image manipulation software such as Adobe PhotoShop® provides the ability to alter and transform digital pictures in a variety of ways. For instance, imaging applications have the ability to transpose one image over another in sequential layers. Additionally, these digital image manipulation programs provide a means to artistically transform sections of an image to create special visual effects such as, adding simulated shadow and reflections, color tone and hue alterations, scale and rotation translations, and so forth. An important concept in creating realistic composite photography is to maintain consistent lighting, perspective and scale between the various elements of a composite image. When multiple image layers are merged into a single montage, digital artists and cinematographers traditionally take great care in recording and visually matching lighting, perspective, and scale attributes between each photographic element of a composite photograph or motion picture frame.

SUMMARY OF THE INVENTION

The present invention is directed to a method to decipher and record attribute information, such as lighting, perspective, and scale from two-dimensional photographs so that each processed photograph may be merged with other processed photographs or three-dimensional computer rendered images having similar attribute values to form a realistic montage. Additionally, the present invention utilizes computer imaging software methods to automatically extract lighting, perspective, and scale information from digitized photographs.

The present invention relates to the use of a three-dimensional target device, having known dimensions and shape, which is placed within a photograph at the time of capture. When photographed, the embedded target device may reveal different geometric outline profiles and, additionally, light reflection and shadow characteristics when viewed and illuminated from various angles. For example, one possible target device configuration is considered to be a flat disc having a spherical dome center. The target device, also known as a composite target may include a colored-coded or patterned circular band around its circumference so that its boundaries may be easily identified in contrast to the natural color fields within a photograph. In addition, the target device may include a neutral white surface, oriented upwards, to provide for a measurement of the apparent color hue of light that illuminates the indexed photograph. The spherical dome center of the target device provides a visual reference indicator as to direction of one or more light sources in much the same way the position of the sun may be ascertained from viewing the Earth's moon. In another embodiment, the condition of the dome surface may be treated in such a manner to produce a finish that reveals spectral highlights to determine comparative levels of light diffusion and ambiance.

Another aspect of the present invention is a process of digitally analyzing photographic images with specialized software to determine lighting and shadow conditions such as a vertical and horizontal direction of light sources in relation to a target device, degree of light diffusion, degree of ambient illumination, and light color. For example, a partial embodiment of the present invention software derives, through algorithms, the apparent perspective and ground surface angles in relation to the camera position, and comparative scale factor of a point within an image as it relates to the position of an embedded target device.

The software enables users to automatically process single or multiple batches of image files so that an encapsulated string of data is electronically associated with, embedded into, or in representation thereof specific image files in a computer file system or database. In an example of the software component of the present invention, a user analyzes and assigns such data to allow efficient searching of image file records in a computer system, network storage device, or Internet accessible server.

In another aspect of the current invention, intermediate software allows a user to utilize assigned image specific lighting, perspective, and scale data to automatically generate three-dimensional computer rendered scenes that match said image files using common animation software programs. In this example, the environmental attributes of the source image are referenced so that the simulated lighting and camera positions are fixed to match the conditions of the source image. A photographer, for instance, may photograph a human subject in a blue-screen studio, and then subsequently have a background environment created within a three-dimensional CAD (Computer Aided Design) system with lighting, perspective and scale matching the subject photograph.

BRIEF DESCRIPTION OF THE DRAWINGS

The foregoing aspects of the invention are illustrated so that the attributes and advantages may be become well understood in the accompanying drawings, wherein.

DETAILED DESCRIPTION OF THE PREFERRED EMBODIMENT

The present invention is directed to a system that automatically analyzes and records specific illumination and positioning attribute values of individual photographic images, such as scenic background images and subject images. The photographic images are assigned attributes, so that they may be combined with other images having similar attributes into a single photo-realistic montage. As used herein, the term "attributes" includes, but is not limited to, lighting direction, perspective, and scale. A user of the present invention for example, may photograph a subject in a studio, and then photograph a separate background image so that each image is photographed with similar attributes. The user may photograph either image before the other, for the purpose of matching attributes from the first image to the second image. In another embodiment, the user photographs and records the attributes of a subject image, then subsequently searches a file system, network storage device, Internet accessible server, or database for background images having corresponding attribute values. Alternatively, the user photographs and records a subject image, according to its attributes. The recorded attributes or attribute values of the subject image may be used to create virtual reality backgrounds produced from a three-dimensional computer model rendering of an environment having similar lighting, perspective, and scale conditions. In another embodiment, the aspects of the present invention may be attributed to producing coordinated virtual reality backgrounds for motion picture composites.

Figure 1:
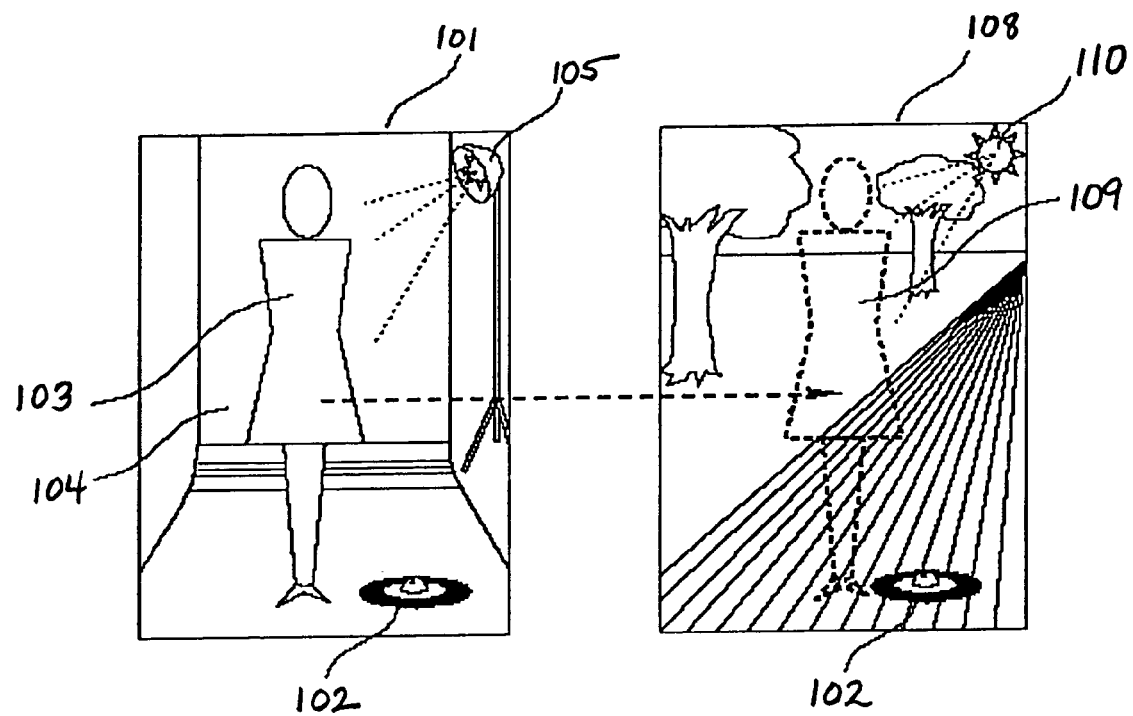
FIG. 1 includes diagrams illustrating an example of the use of a target device within a subject and background image.

The process of coordinating various independent images into a realistic composite is demonstrated in the exemplary illustrations of FIG. 1 for a process of transposing a subject image (101) into a background image (108). In this example, a human figure (103) is photographed against a blue-screen seamless backdrop (104) with a studio light source (105) placed in a similar position to that of the natural or synthetically rendered light source (110) present in the background image. The human figure (103) is digitally separated from the blue-screen seamless backdrop (104) and placed into the background image (108). The two photographs are matched by virtue of having similar characteristics revealed by a target device (102) placed on the ground at the base of the human figure (103) in the subject image (101). In one embodiment, the target devices in the subject and background image are matched by: locating a photographed background image via searching a database of target-embedded background images according to a set of queried values relating to the target device placed in the subject photograph. In another embodiment, the target devices in the subject and background image are matched by modifying the conditions of a photographed subject image during its capture to match the target device values in the background image. In yet another embodiment, the target devices in the subject and background image are matched by producing a computer rendered virtual reality background image that matches the target values of a photographed subject image. In still another embodiment, the target devices in the subject and background image are matched by producing a computer rendered virtual reality subject image to match the target values of a photographed background image.

In one embodiment, the present invention includes the use of digital imaging software and algorithms that aid in the process of locating and analyzing an embedded target device within a photograph. The diagrams of FIG. 2 demonstrate target device (203) located within a digital subject photograph image (201). In this example, the subject photograph (201) is horizontally scanned by converting the image to an array of pixels to identify a high color luminescence value emanating from a color-coded ring (211) of the target device (203) that is placed at the base of the subject (212). The 'Color Luminance Curve' (205) illustrates said resulting scan values from a specific scan line (204) where 'X' (206) equals the horizontal distance from the left edge of the photograph and 'Y' (207) equals the color luminescence value. In this example, the color-coded ring (211) of the target device produces high luminescence values (208). The location of the target device (203) may be determined by compiling the results of the scan line information into a database lookup table and recording horizontal and vertical Cartesian coordinates. A visual representation of the target device (203) location within a photographic-image is displayed in a scan plot (210) where the high luminescence values create a signature (209) of the target device (203).

Figure 2:
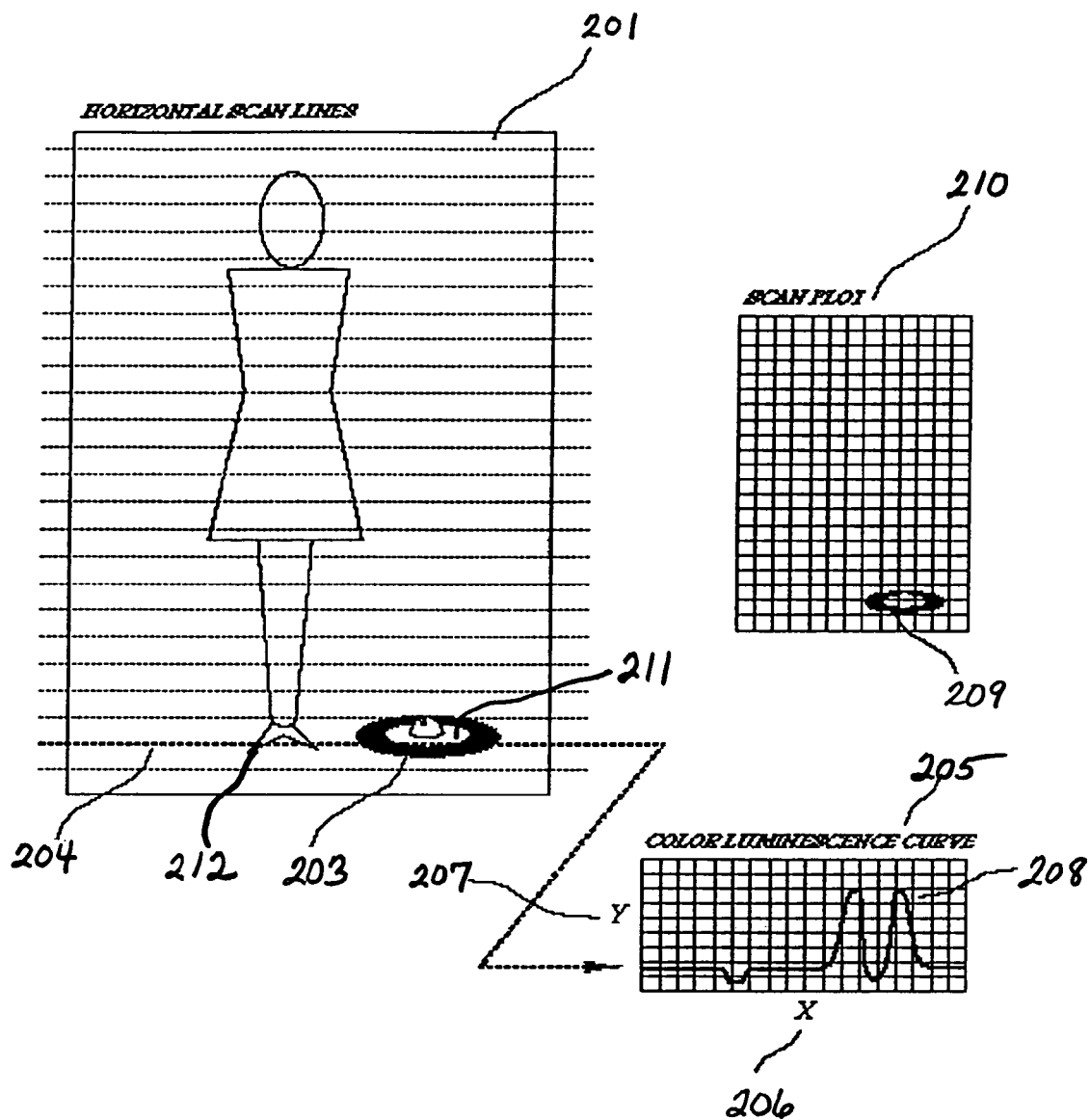
FIG. 2 includes diagrams illustrating an exemplary associated graph displaying a method in which a target device is located within a subject image.
Figure 3:
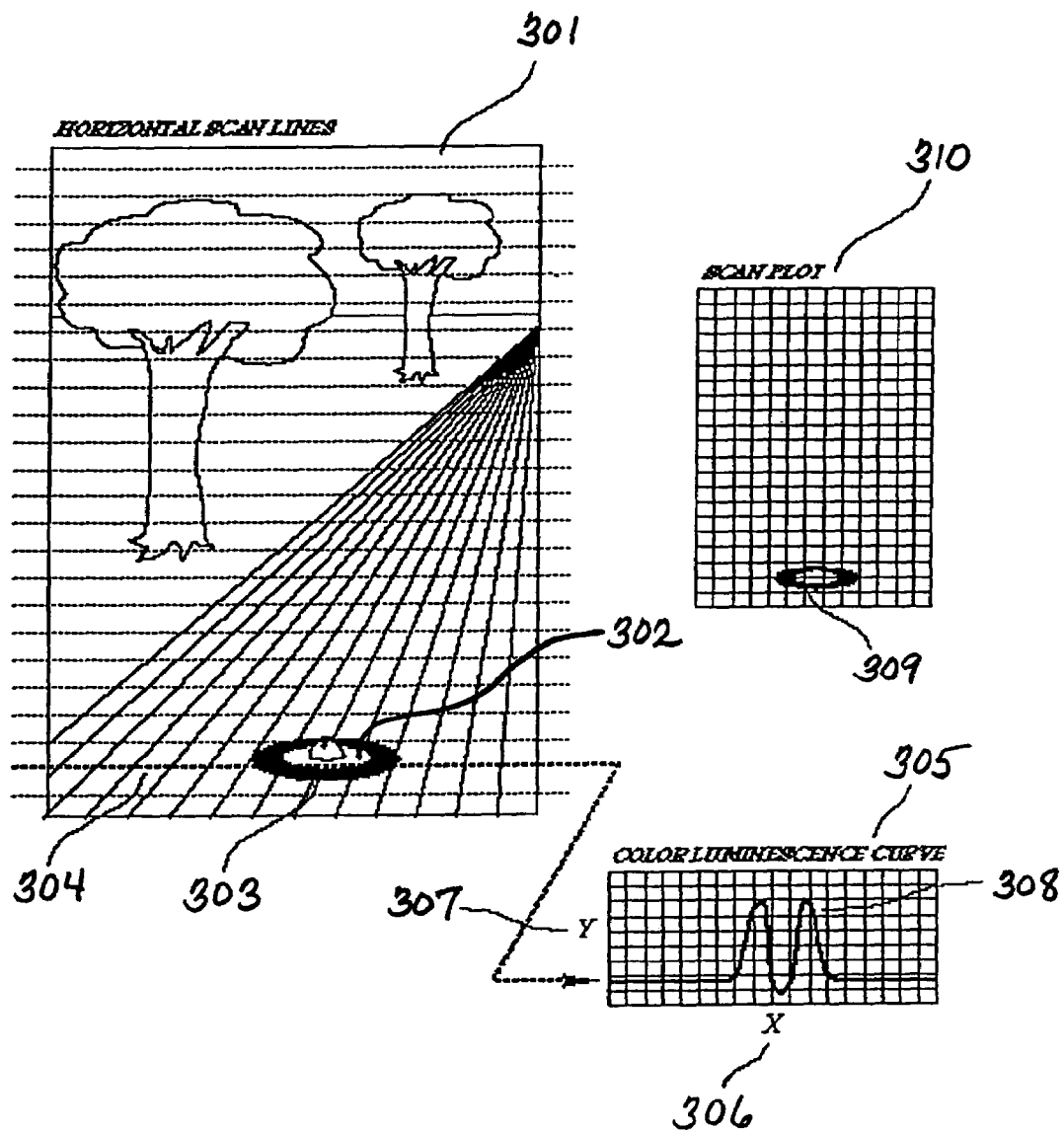
FIG. 3 includes diagrams illustrating an exemplary associated graph displaying a method in which a target device is located within a background image.

In a similar fashion to FIG. 2, the diagrams of FIG. 3 demonstrate how a target device is located within a digitized environment background photograph. As with the foregoing, the background image (301) is horizontally scanned to identify a high color luminescence value emanating from the target device (303) that is placed on a surface within the background image (301). The 'Color Luminance Curve' (305) illustrates the resulting scan values from a specific scan line (304) where 'X' (306) equals the horizontal distance from the left edge of the photograph and 'Y' (307) equals the color luminescence value. In this example, a t color-coded ring (302) of the target device (303) produces a high luminescence value (308). A visual representation of the target device (303) location within the background image (301) may be displayed in a scan plot (310) and the high luminescence values create a target signature (309).

Not withstanding similar variations of the foregoing examples, other methods of detecting said target devices within a digital image include the use of: HSL, HSV, LAB, RGB and other digital image color spaces, and may incorporate the use of such algorithms that employ particle analysis to locate geometric shapes.

Figure 4:
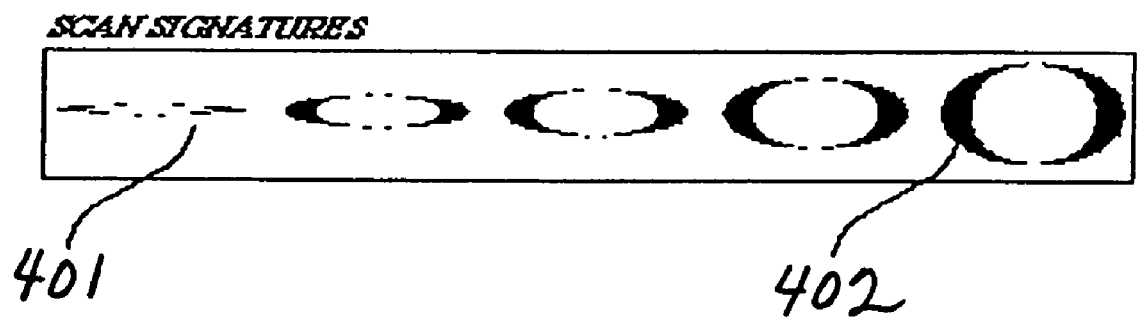
FIG. 4 is a sample illustration of signatures of a target device from various angles.

In one embodiment, the software includes the ability to compensate for the effect of various ground surface angles in reference to the camera position when identifying the target device. The illustration of FIG. 4 displays various scan signatures resulting from the target device when viewed from a camera at different angles to the ground surface. In this example, the left most signature (401) represents a target photographed at a low angle to the ground surface, and the right most signature (402) represents a target photographed at a high angle to the ground surface.

Figure 5:
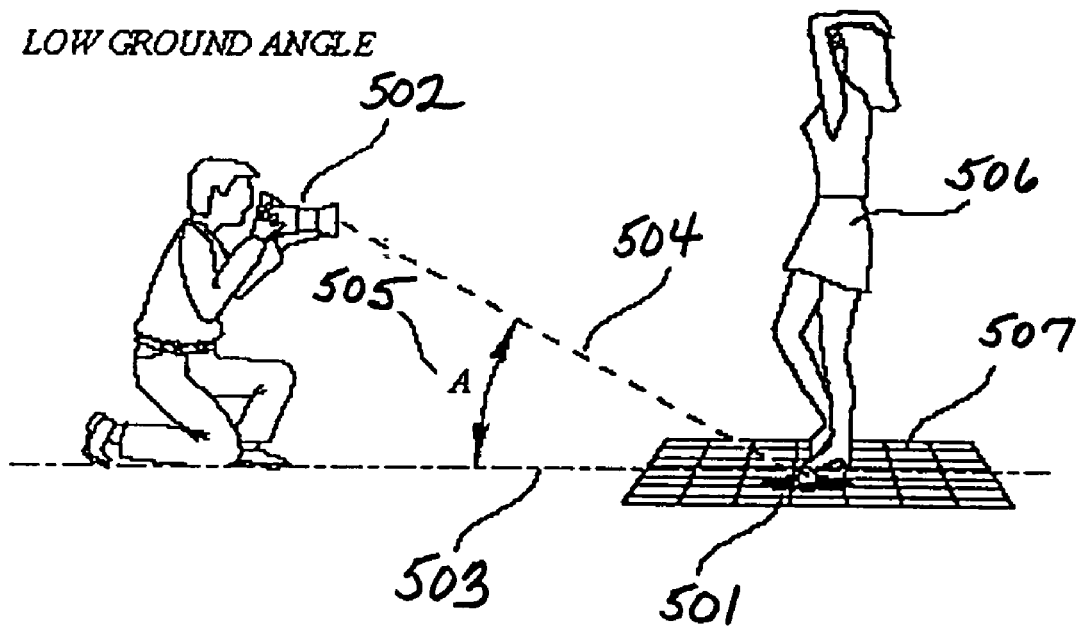
FIG. 5 is a diagram that demonstrates the resulting viewing angle of the ground surface when photographed from a low position.
Figure 6:
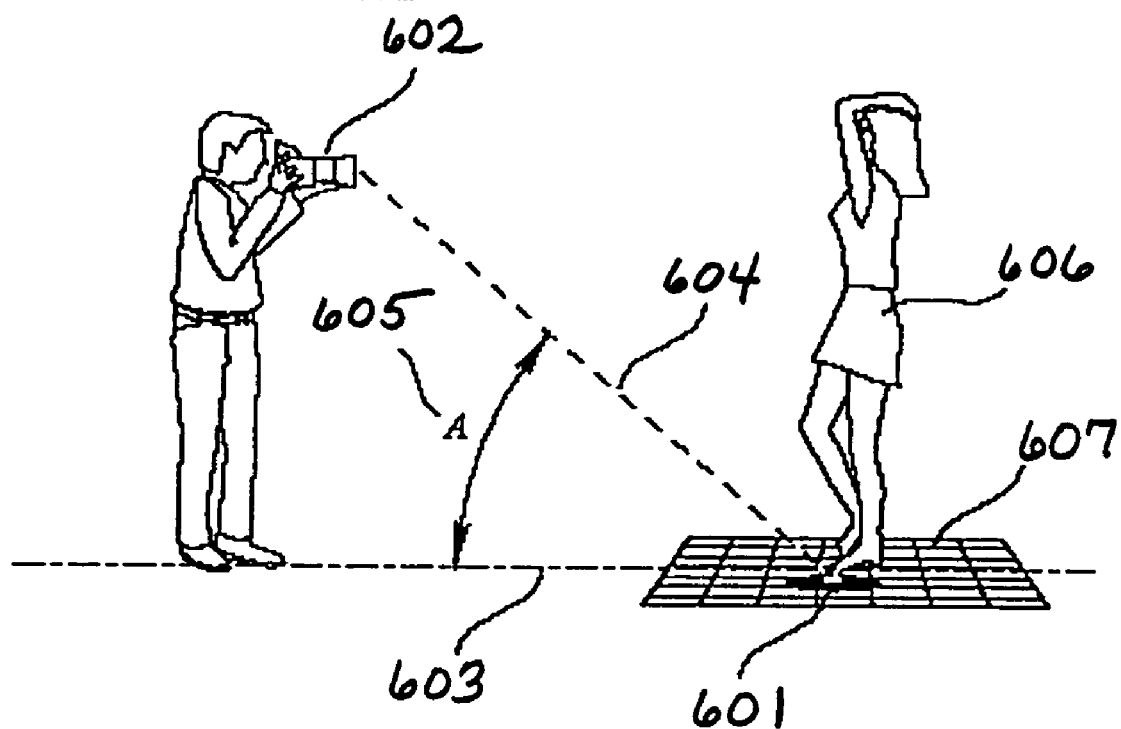
FIG. 6 is a diagram that demonstrates the resulting viewing angle of the ground surface when photographed from a high position.

With the foregoing considered, FIGS. 5 and 6 generally demonstrate how to obtain the angle "A" in which the ground surface (507 and 607) of a photograph is oriented in relation to the camera lens (502 and 602), known as apparent ground surface angle. In this example, FIG. 5 illustrates the capture of a photograph with a low ground surface angle value, while FIG. 6 illustrates the capture of a photograph with a high ground surface angle value. Generally, a composite image having visible ground surface contact with the overlaid subject image component(s) is considered to be more realistic if the ground angle between all the collective images within the composite is similar. The ground surface angle value (505 and 605) is determined by measuring the angle between the horizontal ground surface plane (503 and 603) and a line drawn from a point in the center of the target device (501 and 601) to the center of the camera lens (502 and 602). The ground surface angle value (505 and 605) is generally measured from an axis point at the base of the subject (506 and 606).

Figure 7:
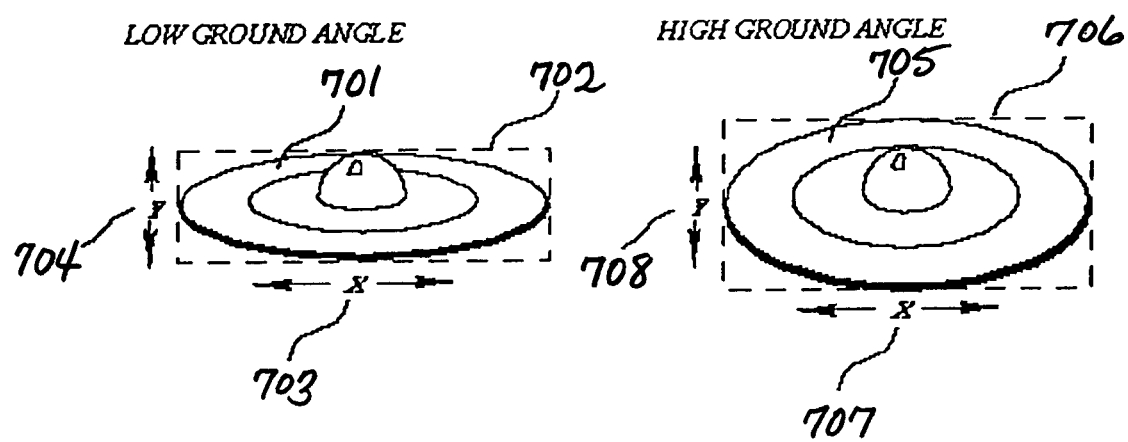
FIG. 7 includes diagrams that demonstrate an aspect ratio of a target device viewed at two different angles for the purpose of calculating a viewing angle of the ground surface in a photograph.

Using computer image analysis software, FIG. 7 demonstrates how a ground surface angle value is mathematically ascertained from the relative position of the target device (702 and 706) placed into a photograph with respect to the viewing position of the camera. The elliptical signature shape of the target identifier ring (701 and 705) of the target device (702 and 706) within a photograph differs based on the position of the camera. Vertical and horizontal measurements are made from the outer boundaries of the target ring (701 and 705). FIG. 7 illustrates the difference of a target device (702 and 706) at a low ground surface angle view and a high ground surface angle view where the width values 'X' (703 and 707) are divided by the height values 'Y' (704 and 708) to determine an aspect ratio value. In another method, a mathematical ellipse is fitted to the target signature to ascertain both ground surface angle and axial moment angle (tilt angle) of the target device.

Often, the visual reality of a composite image is dependent on uniform visual attributes between the collective image components contained within the composite image, among other factors. FIGS. 8, 9, 10, and 11 illustrate examples of how light qualities such as relative direction in relation to camera position, degree of diffusion, and degree of ambiance are ascertained from a digital image.

Figure 8:
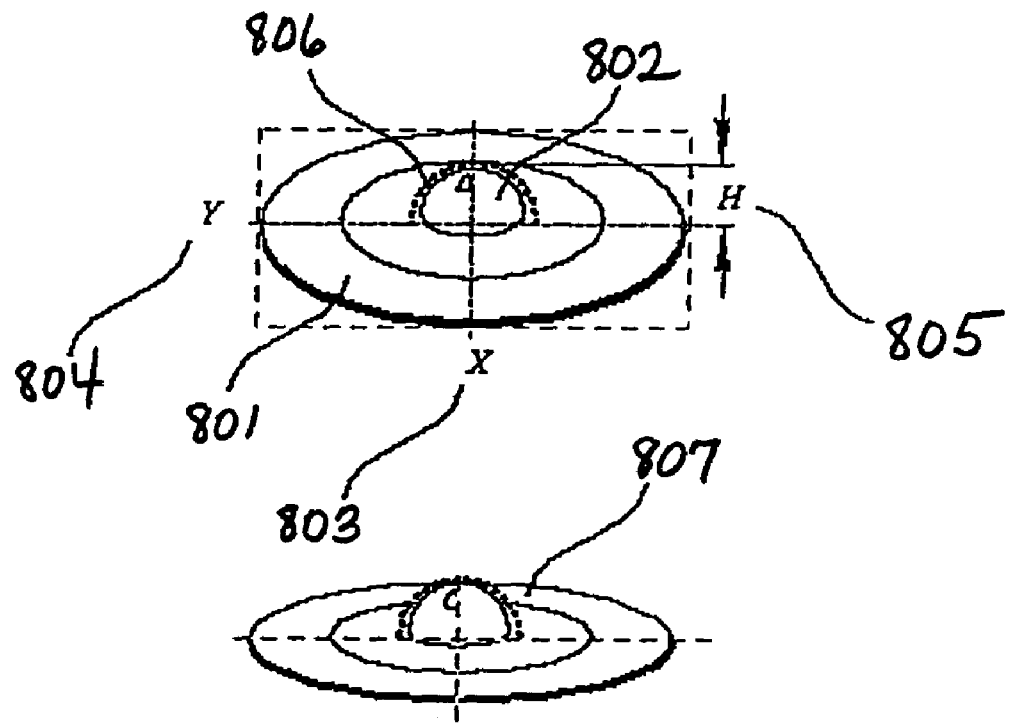
FIG. 8 includes diagrams that illustrate an example calculated scan region in which lighting directional data is ascertained.
Figure 9:
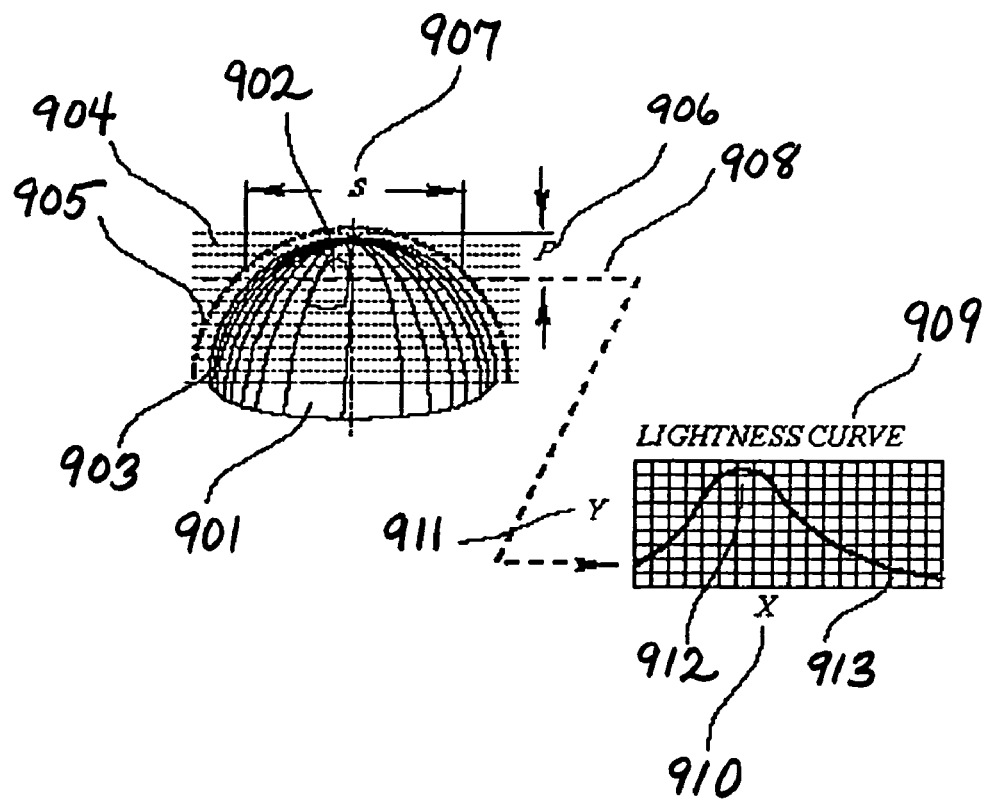
FIG. 9 is a diagram and graph depicting the hypothetical results of scanning across a highlighted area of the dome shape of the target device.

The diagrams of FIG. 8 demonstrate how to locate a region within the target area of a photographed image, where the region is used to identify such attributes as light source direction, light diffusion, and light ambiance. In one embodiment, a smooth, hemispherical shape or dome shape (802) located in the center of the target device (801) is used to reflect a key light source or multiple light sources so that the spectral reflective properties of the surface of the dome shape (802) reveal the horizontal and vertical direction of light. To determine light direction by means of digital analysis, a scan sample region of the target signature as previously described is isolated by the definition of a 180-degree arc as indicated by the dotted line (806). The center point of the arc boundary lies on the intersection of a horizontal line dividing the target signature height Y (804) and a vertical line dividing the target signature width X (803). The arc has a specified height H (805). The arc boundary remains constant in consideration of the various target-device viewing angles (807) with respect to the scheme of locating the arc boundary from the center of the target signature. The diagrams of FIG. 9 illustrate how to extract specific lighting values from within the area of the dome shape (901) of a target device (801) as shown in FIG. 8. In instances other than conditions of highly diffused or omnipresent light, the dome shape (901) is generally illuminated unevenly, resulting in both highlight areas (902) and shadow areas (903). A series of sequential horizontal scan lines (904) determine lightness and darkness values as illustrated in the Lightness Curve graph (909). In this example, a specific scan line (908) is calculated within the defined arc area of the target device (801) shown in FIG. 8 by a function of length S (907) and vertical offset P (906). The highlight reflection area of the main light source (912) is indicated by a relatively high lightness value in the Y dimension (911). Shadow areas of the dome are identified by a low lightness value in the Y dimension (913) while the horizontal location of the foregoing values is determined by the X dimension (910) of the Lightness Curve graph (909). In one embodiment, a lookup table of scan line lightness values having specific location coordinates are compared to a known table of values to determine the elevation and horizontal direction of a light source in a photographed image. Consideration for the ground surface angle of a target device may be determined from the aspect ratio calculated in FIG. 8 as it relates to a known table of values that vary depending on the viewing angle of the target device.

Not withstanding variations of the foregoing, other methods of determining the relative position of light reflection and shadow may also be accomplished by way of particle analysis. Mathematical algorithms may also be used in place of a know table of values to calculate the position of light.

Figure 10:
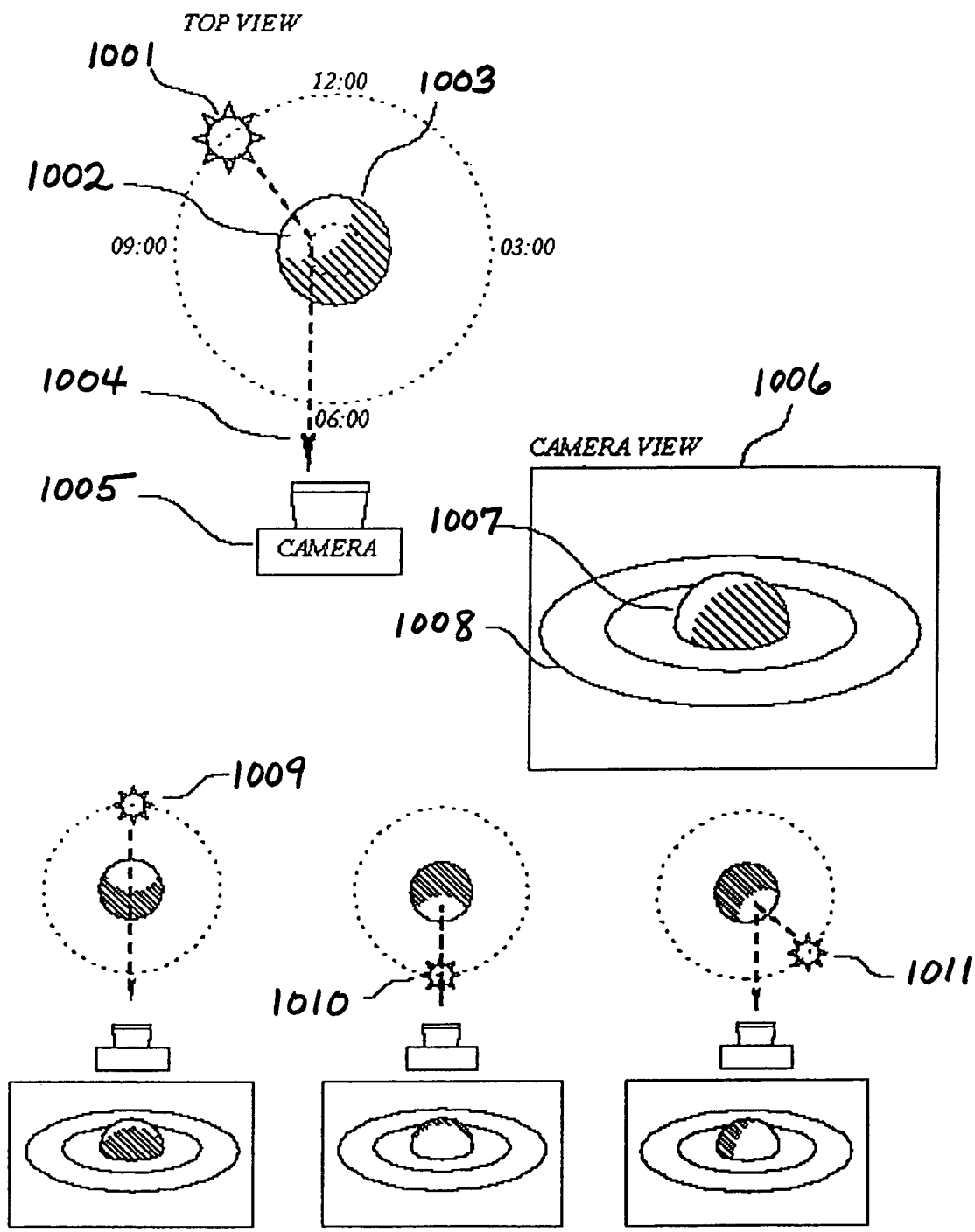
FIG. 10 is a series of exemplary illustrations which demonstrate the effects of various light sources in regard to the surface of the dome shape of the target device.

The exemplary illustrations of FIG. 10 demonstrate a geometric calculation of light direction from the surface of the target dome (1003). A light source (1001) causes illumination of the nearest point on the hemisphere (1002) so that it affects the visual appearance of the sphere from the position of the camera (1005). A portion of light (1004), and varying degrees thereof, emitted from the light source and reflected off the target dome (1003) of the target device (1008) reaches the lens of the camera (1005) so as to create a visual effect similar to lunar illumination from the sun (1007) as viewed from a camera (1005). Back light (1009), front light (1010), and side light (1011) each produce different measurable effects, which are analyzed and digitally plotted to determine light source direction from a two-dimensional camera view (1006).

Figure 11:
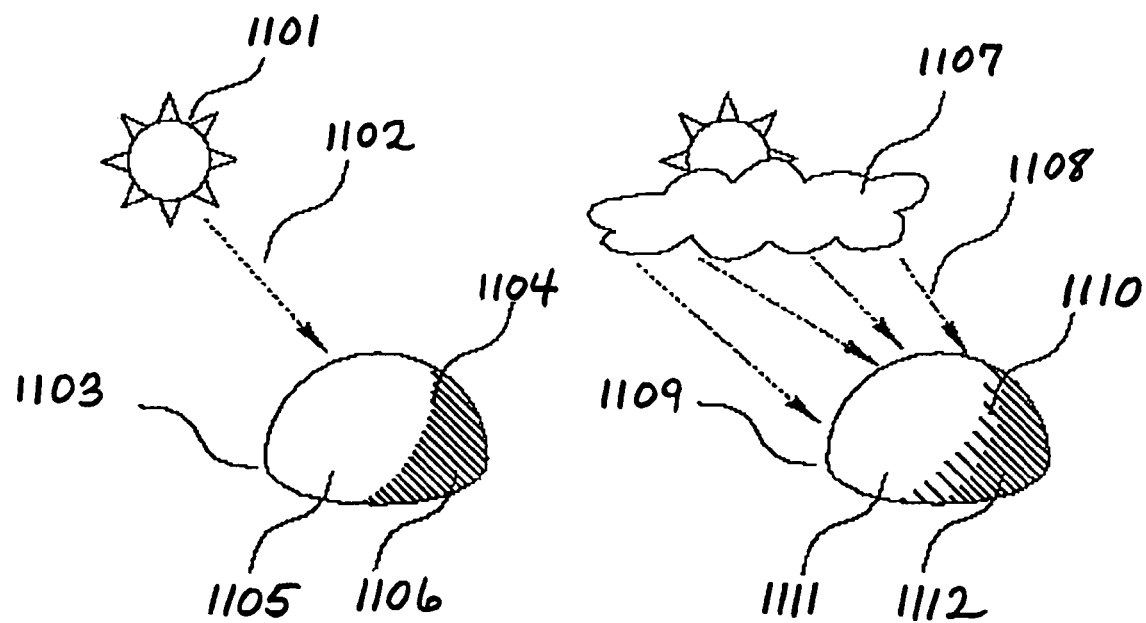
FIG. 11 includes exemplary illustrations which demonstrate the shadow detail difference between diffused lighting and direct lighting on the surface of the dome shape of the target device.

A factor in creating visually real composite images is the consistency of illumination quality between the collective photographic components. In one example, the illumination quality is measured as the degree of diffusion pertaining to each present light source and overall degree of ambient fill light. The exemplary illustrations of FIG. 11 depict the difference in illumination from an unfiltered direct light source (1101) in comparison to a diffused light source (1107). For example, the aligned rays of light in the direct light source example cast a hard or sharp shadow effect (1104) on the first target dome (1103). Conversely, the rays of light in the diffused light source example cause a soft-edged shadow effect (1110) on the second target dome (1109). With regard to the Lightness Curve graph of FIG. 9, a digital scan of the foregoing light direction analysis scheme produces an identifiable sharp curve in direct light conditions and a gradual rounded curve in diffused light conditions. The comparative degree of ambient light is measured in the same manner by comparing the contrast difference between the lightest area (1105 and 1111) of each target dome (1103 and 1109) to the darkest area (1106 and 1112) of each target dome (1103 and 1109). In this example, successive horizontal scan samplings of the area of each target dome (1103 and 1109) are digitally recorded and compared to a known table of values to determine the overall degree of diffusion and ambiance. The overall degree of diffusion and ambiance is stated as a comparative percentage of influence in relation to the strongest light source. The highest degree of diffusion may correspond to a value of 100% whereas the light encompasses 180 degrees such as with overcast sky, while pure direct light such as the unfiltered light of the sun may correspond to a value of 0%. For example, the highest degree of ambient omnipresent light may be recorded as a value of 100% and a single light source in an all black room may effectively produce a value of 0% ambiance.

Alternatively, to using a spherical dome method for determining illumination direction and intensity may include various symmetrically faceted geometric shapes. Such shapes for instance may be analyzed with particle analysis software to determine and compare shade values of specific facets. In this example, facets presented with various angles in relation to a light source produce different reflective and shade characteristics when viewed from a camera position.

With the foregoing and with other parameters considered, another embodiment of the current invention is directed to geometrically influencing automatic virtual reality shadow casting routines such as those used by digital image rendering software programs. In this embodiment, the user photographs a subject with the target device, then analyzes and records such data to automatically and synthetically cast realistic shadows having lighting attributes substantially similar to the attributes of the subject image.

Figure 12:
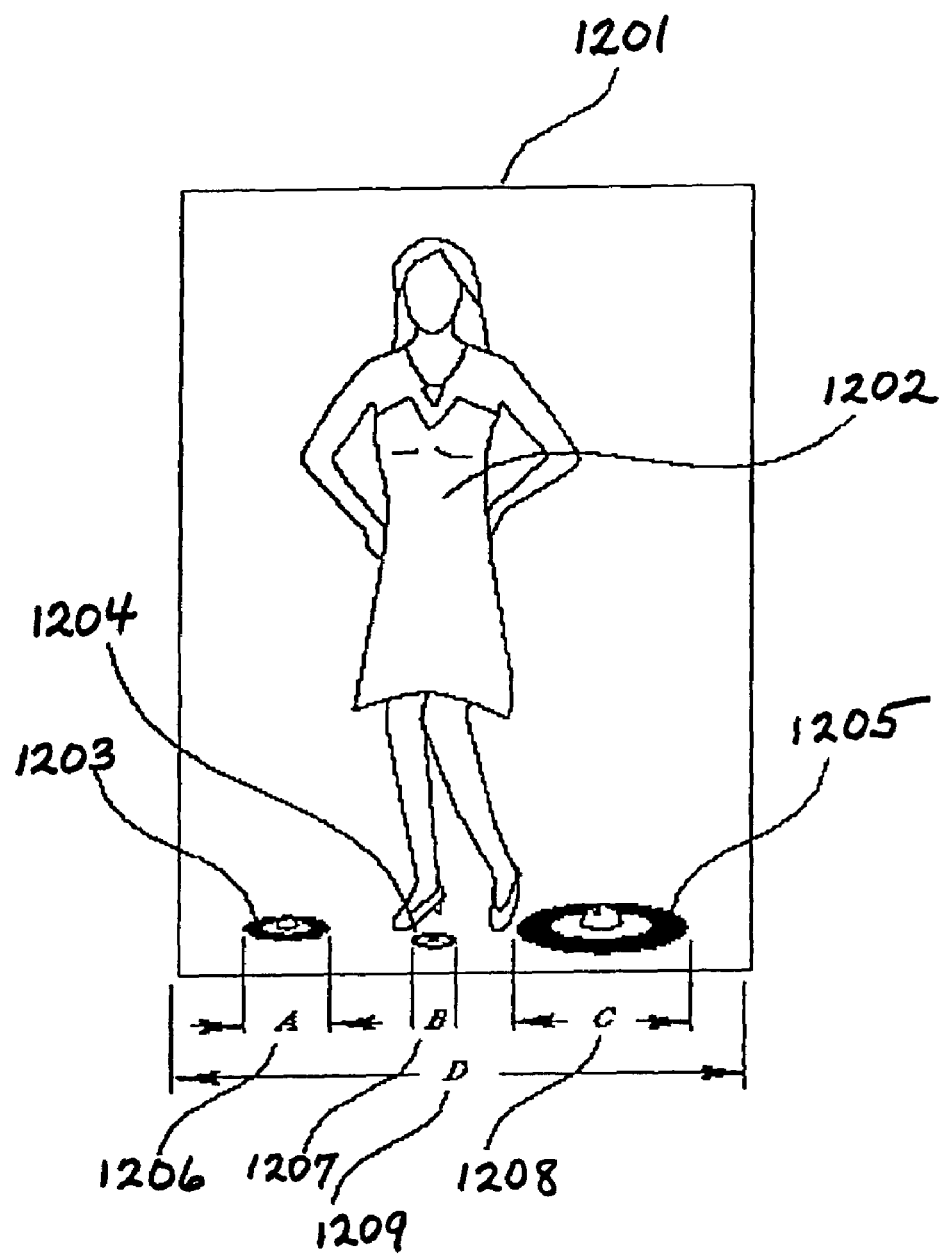
FIG. 12 is a diagram showing a derivation of relative scale from a photograph that includes various target devices.

The diagram of FIG. 12 illustrates how aspects of the invention may be used to measure and record relative dimensional scale of a photograph (1201) in relation to specific known target devices. In one embodiment, the width, A (1206), B (1207), or C (1208), of each target device (1203-1205) placed within the photograph (1201) is divided by the overall width, D (1209), of the photograph (1201) to calculate a specific scale value. In the example illustrated, each proportionately identical target device (1203-1205) has a unique size affiliated with a specific color ring to determine a uniform scale measurement factor. If the medium (e.g., green) target device (1203) at left has a scale factor of '1', then the small (e.g., red) target device (1204) at center has a scale correction factor of '2' and the large (e.g., orange) target device (1205) on the right has a scale correction factor of '0.5'. For example, if the software algorithm finds a green target, then the associative scale of the image is known. The various sized target devices (1203-1205) allow the photograph (1201) to be captured with proportionately sized targets relative to the true scale of the image without excessive impairment to the image quality. In this example, the medium target device (1203) with a scale factor of '1' is used for capturing a human figure (1202). The small target device (1204) is used in conjunction with small objects such as jewelry or dishware, and the large target device (1205) is used in conjunction with large objects such as tents or automobiles.

One of the aspects of the invention is to utilize such target device designs that are proportionality scaled and uniquely identified from any viewing angle by color regions or geometric patterns and graphic markings.

Figure 13:
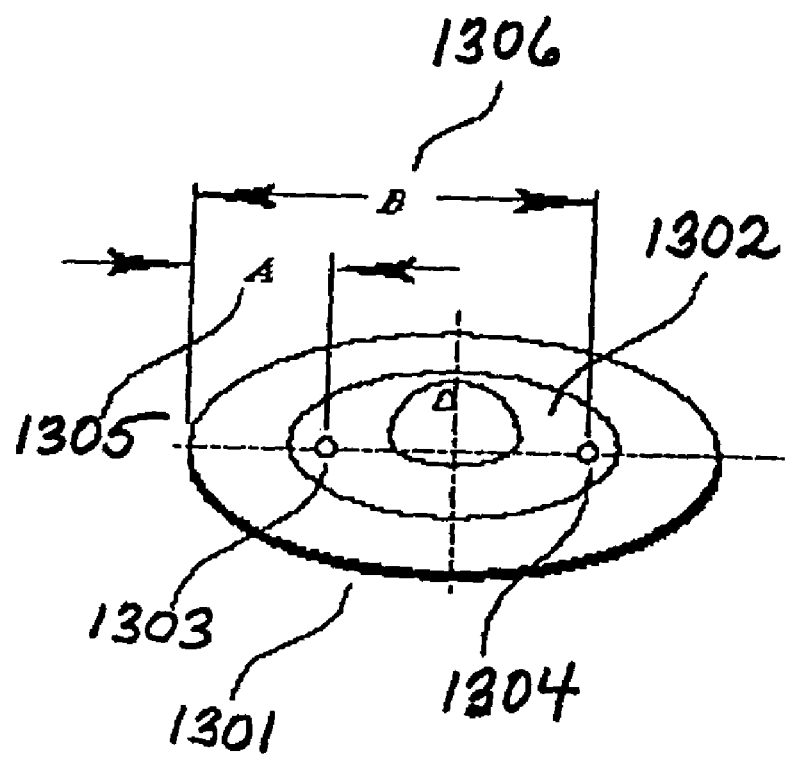
FIG. 13 is a diagram that illustrates a measurement of a sampling point location on a target device.

Another factor in the creation of realistic montages is the uniformity of light temperature illumination between the collective component images of a composite. The diagram of FIG. 13 illustrates measuring apparent light color temperature from a signature of a target device (1301). In one embodiment, a known white point is sampled such that digital image analysis software consistently meters and records specific areas of the target device (1301). A color field (1302), such as a flat neutral white material, is affixed to the target device (1301). One of two sampling points (1303 or 1304) of the target device (1301) is unaffected by the shadow cast from the target dome, and is selected to meter the color hue value of the color field (1302) in comparison to a neutral color standard. In one example, the two sampling points (1303 and 1304) are located by horizontally measuring a distance A (1305) or B (1306) from the left edge of the target device (1301). The left sampling point (1303) is located a distance of A (1305) from the left edge of the target device (1301), and the right sampling point (1304) is a distance of B (1306). The two sampling points (1303 and 1304) are located along a horizontal line that divides the signature of the target device (1301).

Figure 14:
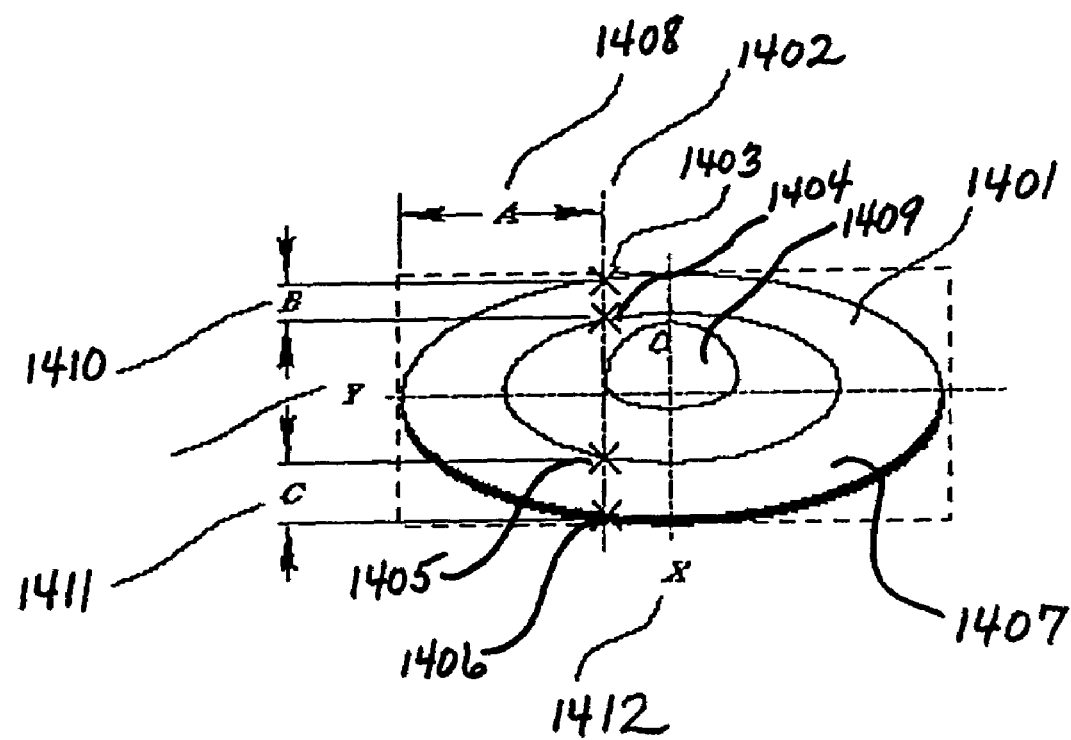
FIG. 14 is a diagram that illustrates a determination of sampling points on a target device to determine a vanishing point perspective factor.
Figure 15:
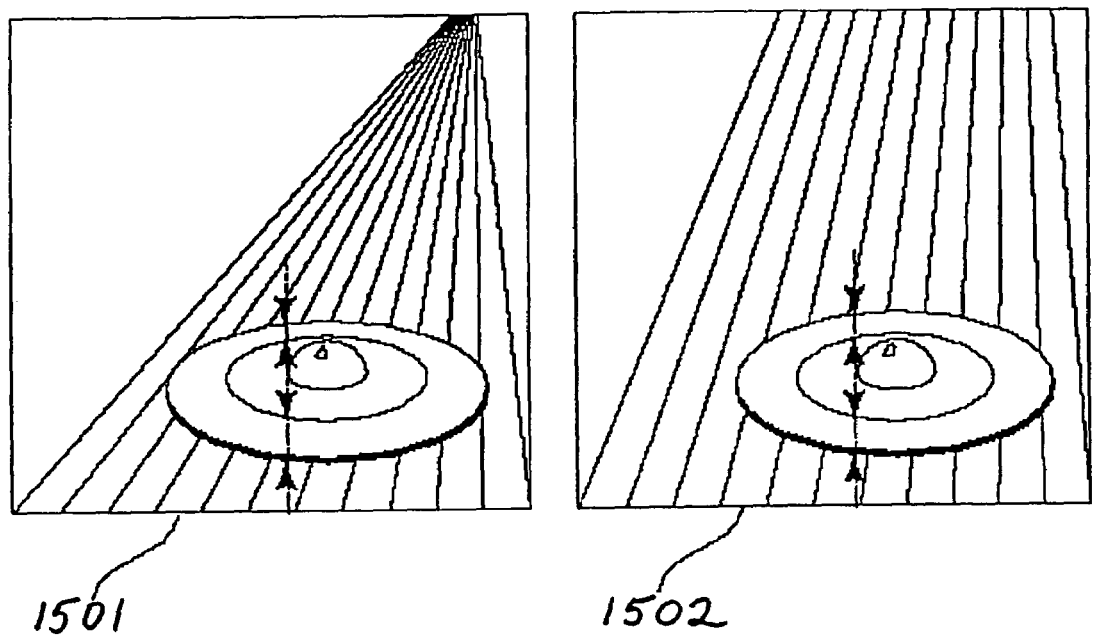
FIG. 15 is an exemplary illustration that demonstrates the effect of optical perspective between two similar camera views.

In addition, a uniform perspective measurement, known as a vanishing point perspective factor, may be influential in creating realistic composites. The diagram of FIG. 14 demonstrates an exemplary method by which a vanishing point perspective factor is ascertained from a signature of a target device (1401). A vertical scan line (1402) bisects the target device (1401) across an area of unobstructed vision on a target identifier ring (1407). Four measurement points (1404-1406) are located on the vertical scan line (1402) at the transitional color boundaries of the target identifier ring (1407). In one embodiment, the position of the vertical scan line (1402) is calculated according to a proportionate offset distance A (1408) as a function of the width X (1412) of the target device (1401) so that the dome shape (1409) of the target device (1401) is avoided. A ratio calculated by comparing the distance B (1410) between the back two measurement points (1403 and 1404) and the distance C (1411) between the front two measurement points (1405 and 1406) results in establishing a vanishing point perspective factor. In one aspect of the present invention, the vanishing point perspective factor is compared with a table of known values to provide a user with an indication of camera lens length. As an example, a user may convey intended camera lens lengths between a subject and background image photo-shoot. The illustration of FIG. 15 demonstrates the effect of optical perspective between two similar camera views. The left view (1501) is that of a short camera lens which produces a wide angle effect, while the right view (1502) depicts that of a long camera lens that produces a substantially isometric effect.

Figure 16:
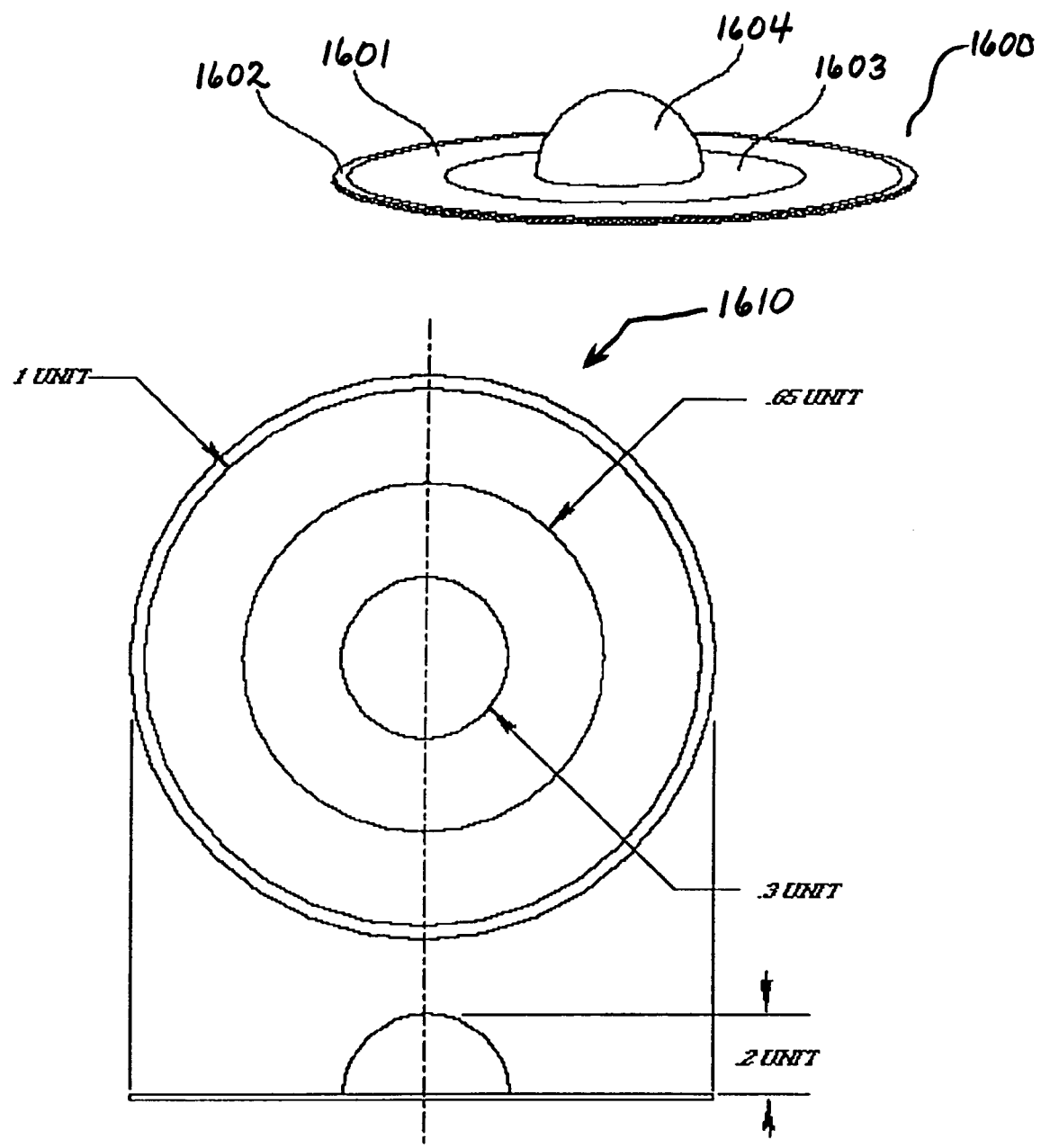
FIG. 16 is a schematic diagram that includes two views of a target device.

In one embodiment, the target device is a rigid flat disc or disc portion having a three-dimensional shaped central portion. The diagrams of FIG. 16 illustrate an exemplary target device having a domed spherical center section and a circular disc portion. Other shapes may be utilized for the three-dimensional shaped central portion, such as an inverted cone with a domed surface, a vertical shaft topped with a sphere, or other symmetrical combinations of three-dimensional shapes. The symmetry of the three-dimensional central portion allows the target device to be photographed from any position. Other shapes may also be used for the disc portion, such as a rectangular disc, elliptical disc, rings or other shapes that are symmetrical to allow the target device to be photographed from any position. In one embodiment, the target device (1600) is proportionately dimensioned and produced in various sizes. The diagram (1610) of FIG. 16 illustrates exemplary dimensions for the target device (1600). In another embodiment, the target device (1600) is produced in relational unit measurements according to a determined standard such as one unit of measure equaling ten centimeters. In yet another embodiment, the target device (1600) is produced in various sizes relative to specific color codes that are identified by digital image analysis software. The color codes invoke scale correction variables from the digital image analysis software and are applied in calculating the scale factor of an indexed photograph. Concentric color rings are used to increase the digital visibility of the target device. In one example, a color ring (1601) of either fluorescent green, red, orange, yellow, pink or blue material may be applied to the target device surface. Any color pattern which contrasts with a surrounding environment and is identifiable by such digital imaging software may be used in the target device (1600). In one embodiment, an outer border (1602) of dark or light colored material that contrasts with the target color ring is included on the target device (1600) for visual separation between the color ring (1601) and the environmental surroundings. A center ring (1603) of a neutral light color density such as a flat white material included on the target device (1600) is used to measure light color and perceived temperature. The target device (1600) includes a protruding spherical feature or dome shape (1604) at its center for measuring such attributes as light direction, light diffusion, and light ambiance. The target device (1600) also comprises a surface, such as the surface of the domed shape (1604), which reflects spectral light rays. In one embodiment, the target device (1600) is symmetric from all horizontal viewing positions of equal height so that a specific orientation is not required. In another embodiment, the target device (1600) includes a recess or a protrusion (not shown) at a center position on the bottom side of the target device (1600) to allow the target device to be securely mounted atop a common stand or other device (not shown) to elevate the target device above ground. In addition, the target device (1600) may include other means to allow the target device to be elevated to a horizontal position above ground.

Figure 17:
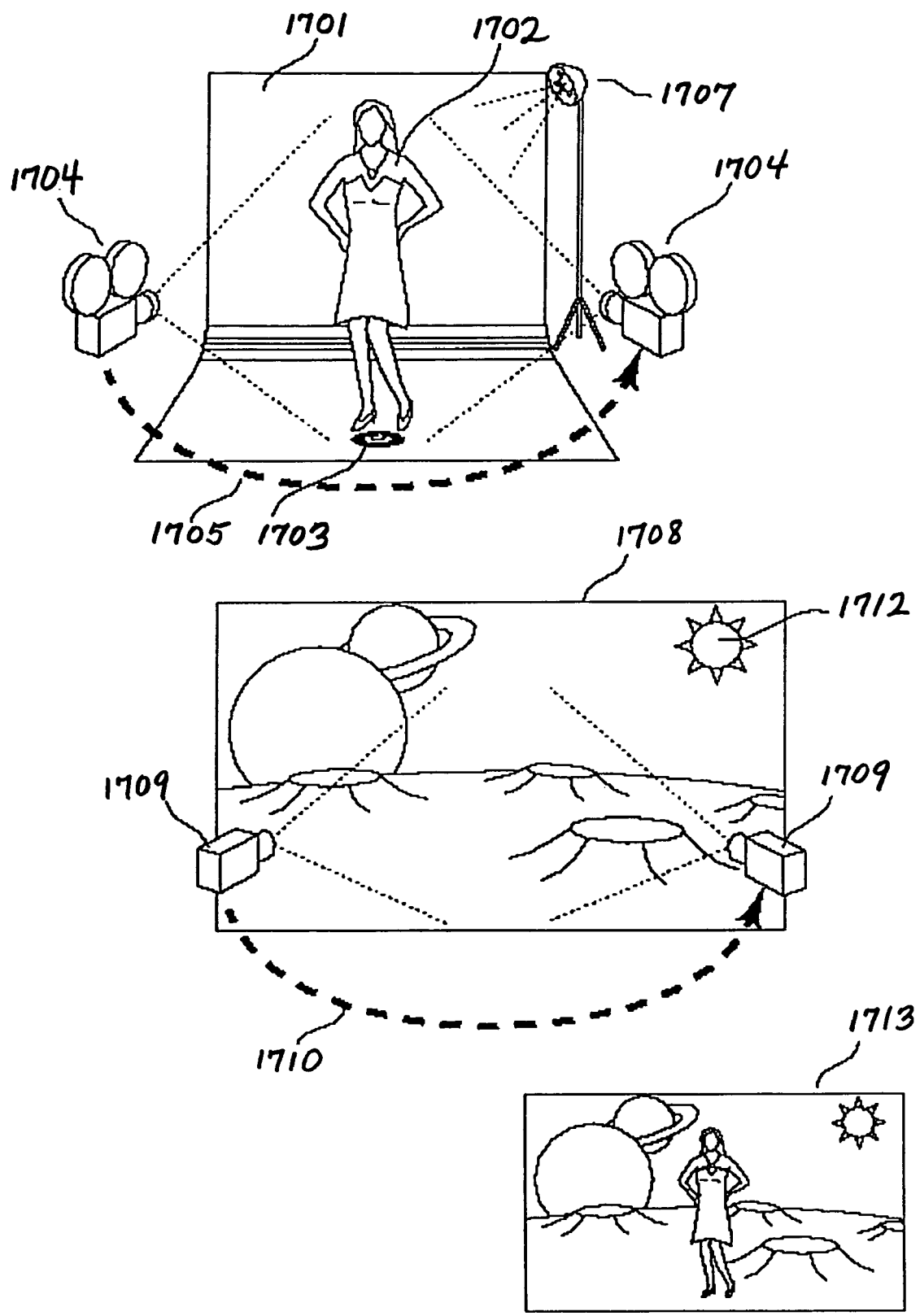
FIG. 17 is a set of diagrams that demonstrate an exemplary use of the current invention for multi-frame cinematography composites, in accordance with the present invention.

The various foregoing aspects and traits of the present invention also apply to sequential frame photography mediums such as motion pictures, video, multimedia and other forms of animated photographic imagery. The illustrations of FIG. 17 demonstrate an exemplary use of the current invention in a coordinated and sequentially key-framed transitional movement of a motion-image-capture device such as a motion picture camera or video camera. In one embodiment, a human figure or other subject (1702) is filmed in front of a seamless blue-screen backdrop (1701) with the target device (1703) placed within the visible image area. In this example, the subject (1702) is illuminated from a light source (1707). The subject camera (1704) pans from a left position along a trajectory (1705) to an end position. A concurrent background image (1708) is either filmed or animated in the same manner as the foregoing subject example. The background camera (1709) may move from left to right along an equal trajectory (1710) as the subject camera (1704). In this example, the target device (1703) directs the simulated position of the computer cameras and the attributes of a light source (1712) in the background image (1708) so that combining live footage with computer animation may produce a realistic motion picture composite (1713).

While an exemplary embodiment of the invention has been described and further illustrated, it will be appreciated that various changes may be made therein without departing from the intended scope of the invention.

I claim:

1. A target device comprising:
   a three-dimensional shaped portion having one or more known dimensions,
   wherein the three-dimensional shaped portion is configured to be captured within a digital image for analysis by digital imaging software such that an attribute of the digital image is determined, wherein the attribute is determined based at least in part on the one or more known dimensions.

2. The target device of claim 1, comprising a disc portion mounted to the three-dimensional shaped portion, wherein the disc portion includes concentric rings that are color-coded to increase visibility of the target device within the digital image.

3. The target device of claim 2, wherein the concentric rings are configured to contrast with a surrounding environment and are identifiable by the digital imaging software.

4. The target device of claim 2, wherein the disc portion further includes an outer border of colored material that contrasts with the concentric rings such that the outer border provides a visual separation between the concentric rings and environmental surroundings included in the digital image.

5. The target device of claim 4, wherein the environmental surroundings comprise at least one of a background or a subject that are captured in the digital image.

6. The target device of claim 2, wherein the concentric rings include a ring of a neutral light color density that enables a measurement of light color and perceived temperature associated with the digital image.

7. The target device of claim 1, wherein the attribute comprises one or more of a light direction, a light diffusion, and a light ambiance associated with the digital image.

8. The target device of claim 2, further comprising a graphical pattern on one or more of the disc portion and the three-dimensional shaped portion, wherein the graphical pattern is used in determining a relative size of the target device.

9. The target device of claim 1, wherein the three-dimensional shaped portion includes a substantially spherical surface, a substantially elliptical surface, or a faceted surface.

10. The target device of claim 2, wherein the disc portion is substantially circular in shape or substantially square in shape.

11. The target device of claim 1, wherein the three-dimensional shaped portion includes a surface arranged to reflect spectral light rays.

12. The target device of claim 2, wherein the disc portion is symmetric from horizontal views of equal height.

13. The target device of claim 1, further comprising an elevating device configured to position the three-dimensional shaped portion at a predetermined height.

14. A method for determining attributes of an image, the method comprising:
    locating a three-dimensional target device within a digital image;
    measuring attributes associated with the three-dimensional target device; and
    automatically associating the attributes of the three-dimensional target device with the digital image.

15. The method of claim 14, wherein associating the attributes further comprises storing the attributes in a database in association with the digital image.

16. The method of claim 14, wherein associating the attributes further comprises embedding the attributes into the digital image.

17. The method of claim 14, wherein locating the three-dimensional target device further comprises:
- scanning the digital image for a high color luminescence value emanating from the three-dimensional target device, wherein the high color luminescence value is used to generate a color luminance curve; and
- examining the color luminance curve to determine a distance of the three-dimensional target device from an edge of the digital image.

18. The method of claim 14, wherein one or more of a particle analysis and a color space analysis is used to locate the three-dimensional target device.

19. The method of claim 14, wherein locating the three-dimensional target device further comprises scanning the digital image for a geometric shape corresponding to the three-dimensional target device.

20. An apparatus for indexing an image with visual attributes, comprising:
- a means for locating a target device within a digital image, wherein the target device includes a three-dimensional shaped portion;
- a means for measuring one or more visual attributes associated with the target device by examining the three-dimensional shaped portion; and
- a means for associating the one or more visual attributes of the target device with the digital image, such that the digital image is indexed with the visual attributes.

* * * * *